United States Patent [19]

Sou

[11] Patent Number: 4,498,422
[45] Date of Patent: Feb. 12, 1985

[54] BOTTOM BOX FOR PET CAGE

[76] Inventor: Teho Sou, 7-18 Higashiimazato 2-chome, Higashinari-ku, Osaka, Japan

[21] Appl. No.: 547,445

[22] Filed: Oct. 31, 1983

[51] Int. Cl.³ ............................................. A01K 31/06
[52] U.S. Cl. .................................................... 119/17
[58] Field of Search ................... 312/330 R, 347, 348, 312/350; 211/88, 94, 126, 162, 166

[56] References Cited

U.S. PATENT DOCUMENTS

| | | | |
|---|---|---|---|
| 1,211,546 | 1/1917 | Clippinger | 119/17 |
| 2,708,900 | 5/1955 | Yellin | 119/17 |
| 2,741,223 | 4/1956 | Winborn, Jr. | 119/1 |
| 3,220,364 | 11/1965 | Sandin | 211/162 |
| 3,310,031 | 3/1967 | Lowe, Jr. | 119/1 |
| 3,688,741 | 9/1972 | Thompson et al. | 119/1 |
| 3,745,975 | 7/1973 | Prucha | 119/1 |
| 3,752,120 | 8/1973 | Pallesi | 119/1 |
| 3,830,200 | 8/1974 | Patterson | 119/17 |
| 4,190,525 | 2/1980 | Menzel | 119/1 |
| 4,319,545 | 3/1982 | Sou | 119/17 |

FOREIGN PATENT DOCUMENTS 534306  3/1941  United Kingdom .................. 119/17

Primary Examiner—Gene Mancene
Assistant Examiner—Kris R. Schulze
Attorney, Agent, or Firm—Trexler, Bushnell & Wolters, Ltd.

[57] ABSTRACT

A pet case comprising a bottom box body and a garbage receptacle being loaded in the former is disclosed, wherein the bottom box body has a circumferential wall plate consisting of a front plate, a rear plate, and both side plates, and is provided with a consecutively formed mounting shelf for a sheet of wire net on each of the inner wall faces of the rear plate and both the side plates, and further with the protruding pieces for mounting a garbage receptacle under the mounting shelf for the sheet of wire net, whereby there is no necessity to prepare a bottom plate, and consequently the bottom box body can be molded integrally by using plastics and at a low price.

2 Claims, 5 Drawing Figures

BOTTOM BOX FOR PET CAGE

This application is a continuation of application Ser. No. 341,898, filed Jan. 22, 1982.

BACKGROUND OF THE INVENTION

This invention relates to a bottom box whereon a wire netting frame of a pet cage is to be supported, and more particularly is concerned with one which is more hygienic as compared with conventional ones and strongly-built to be resistive to twist and strain, though with a less amount of molding material consumed.

A pet cage is public-known which was composed of a bottom box having a bottom plate and four side walls, and a wire-netting frame being mounted on the upper brim of that bottom box. A pet cage of this type was such that a garbage receptacle convenient for inserting and withdrawing was mounted on the bottom plate. What is more, mounted directly on the upper end face of the circumferential wall of the garbage receptacle was a sheet of wire net being spread there as a floor whereon the pet animal played about gamboling or crawling. Heretofore, when the wire netting frame over the bottom box or the above-mentioned sheet of wire net was loaded on the four side walls of the bottom box, it was usually mounted on a shelf which was formed by making each upper part of the four side walls of the bottom box project outward in the form of a step. Therefore, in the case of the bottom box such as used in conventional pet cages, even though in the bathing time of a little bird or a small animal, splashed waterdrops or minute residua of feed could be for the most part recieved by the garbage receptacle, but it was inescapable that waterdrops or garbage still continued to intrude even into the gaps between the circumferential walls of both garbage receptacle and bottom box, and as a result there occurred further the necessity of providing a bottom plate as a collector of those waterdrops or garbage. But then a new gap came to be produced between the circumferential wall of the garbage receptacle and the inner circumferential wall of the bottom box because of the circumferential wall of the garbage receptacle being situated interiorly to the inner circumferential wall of the bottom box. It followed from this that waterdrops or fine trash fell through this gap, or else the unclean matter accumulated in the gap and failed to drop into the bottom box. On the other hand, since the shelf whereon the sheet of wire net and the wire netting frame were to be mounted was located exteriorly to the inner circumferential wall of the bottom box, it did not carry out the function of stopping the gap.

Under these circumstances, this invention, in consideration of a steep rise in prices of plastic-molding material, aims to the molding of an improved box with 50 to 70% of the amount of the material consumed in fabrication of conventional bottom boxes, thereby trying to clear the bottom box of conventional pet cages of its bottom plate. But seeing that the bottom plate of the bottom box was playing such an important role as mentioned before, it became inevitable to make something which should take place of the bottom plate of the bottom box. When such a thing was tried to be formed with the use of plastics, it was necessary to employ a complicated and expensive metallic mold, consequently involving a weak point that the products could not be supplied in low prices and in large quantities. Then as another method to eliminate a bottom plate of this kind, there was thought of the provision of a two-stepped shelf for both the sheet of wire net and the garbage receptacle on the inside of the four side walls of the bottom box. However there remained a defect that the integral molding of plastics was difficult and proved to be expensive. In view of the above failures, a bottom box was formed with metallic plate without the bottom plate, and another bottom box was formed having interconnected separately-formed three walls consisting of one rear plate and two side plates in accordance with the previous invention of this author However, any of these two proposals had all the same the weakness of being deficient in durability and hard to handle. In these circumstances, our invention has come in according to which it became possible to create a bottom box which can do without a bottom plate and has the four side walls entirely similar to conventional bottom boxes at that.

It is a general object of this invention to provide a pet cage which has no need for the provision of such a bottom plate on its bottom box as seen in conventional pet cases which is able to receive wholly waterdrops or minute rubbish splashed at the bathing time of the small animal or the little bird, by means of a garbage receptacle without purposely furnishing the bottom plate, and which is not apt to soil the surroundings with waterdrops and other droppings under and around the bottom box.

Another object of this invention is to provide a bottom box arrangement for a pet cage which is held resistant to twist and strain and is able to stand under a great weight on the basis of being constructed of the four side walls.

A further object of this invention is to provide a pet cage which is possible to integrally formed without being in need of employing some complicated and expensive mold such as a split pattern and the like and only with the help of an injection mold by being furnished with means for slidably mounting the garbage receptacle in the form of a plurality of protruding pieces directly under the shelf for placing the sheet of wire net, thereby being able to be produced in low prices and in large quantities.

Still a further object of this invention is to provide a pet cage which satisfactorily meets the existing economic situation of this field by getting rid of the harmful influence resulting from the removal of the bottom plate from the bottom box and further by having reduced the amount of molding material consumed by the portion of the remvoed bottom plate.

Other objects and advantages of this invention will become more apparent from a reading of the following detailed description taken in connection with the accompanying drawings.

DETAILED DESCRIPTION

Description will be now directed to a preferred embodiment of the invention. This description, however, is not to be construed that the invention is limited only to this embodiment. It is not so, but the invention will comprehend all of variations and modifications which are contained in the spirit and scope of the inveniton defined in the appended claims.

Figure 1:
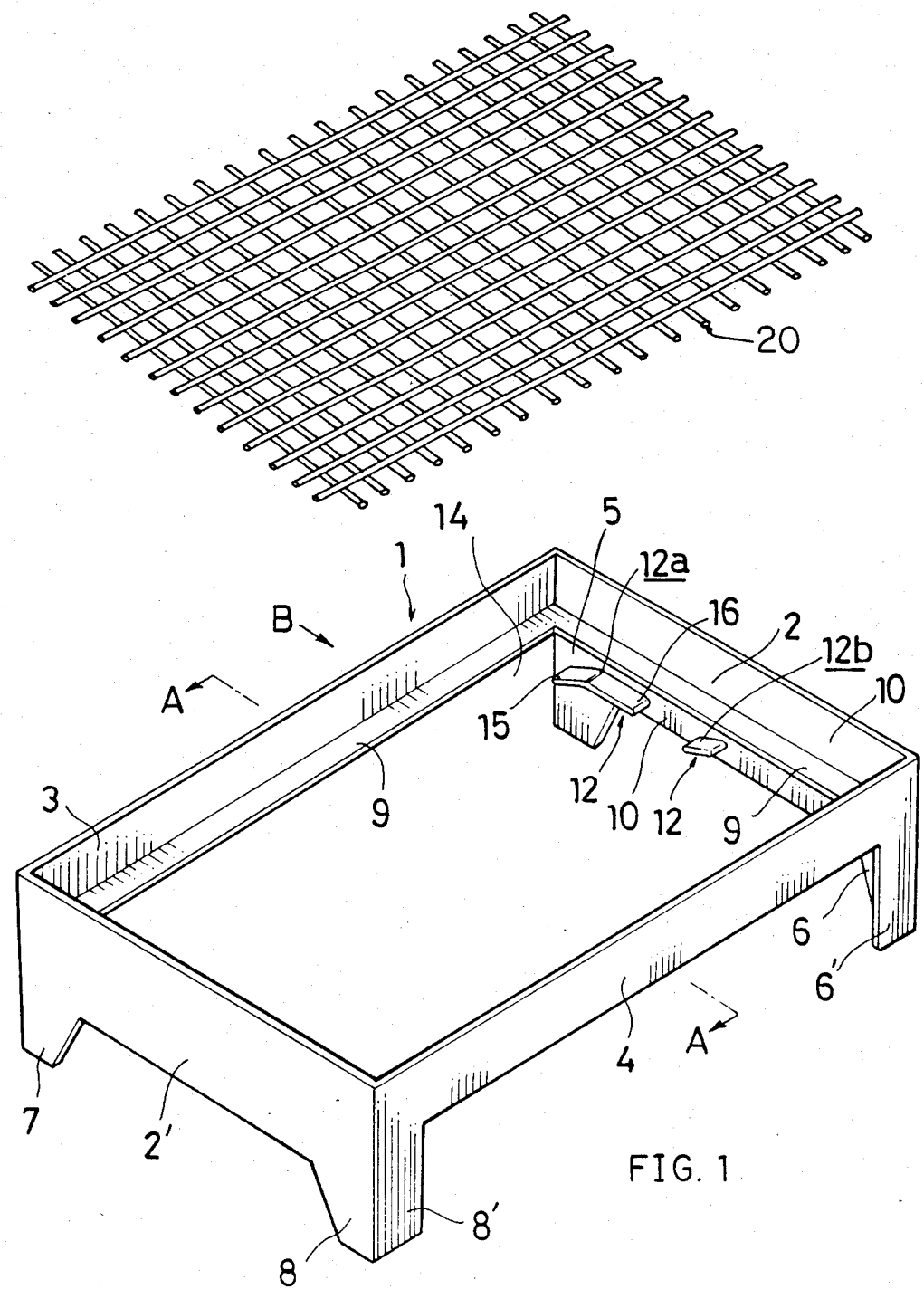
FIG. 1 is an exploded perspective view of a bottom box of the pet cage according to the present invention.
Figure 2A:
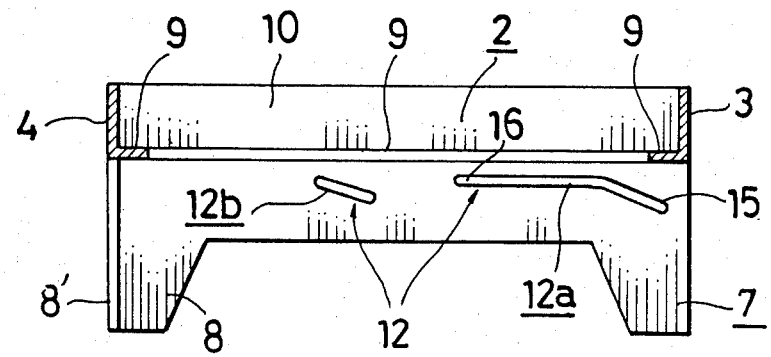
FIG. 2a is a cross-sectional view taken on line A—A of FIG. 1.
Figure 2B:
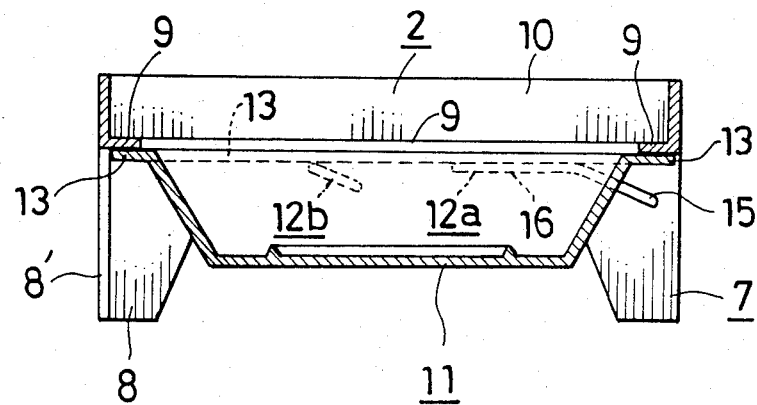
FIG. 2b is a cross-sectional view in a state where a garbage receptacle is inserted into the bottom box body of the pet case.
Figure 3:
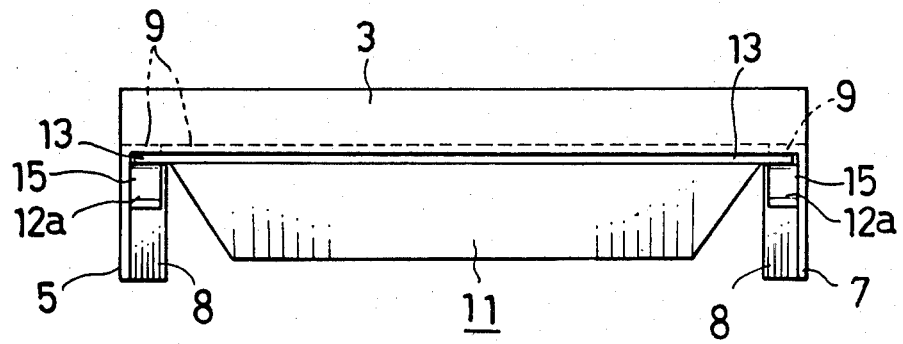
FIG. 3 is a front view in a state where the garbage receptacle is inserted into the pet case of the present invention.
Figure 4:
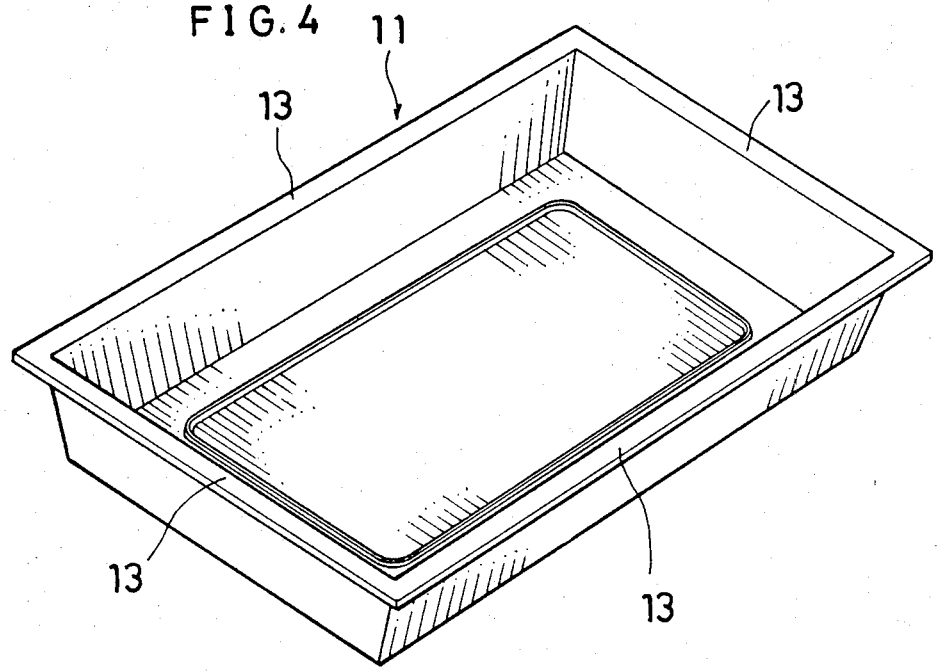
FIG. 4 is a perspective view of the garbage receptacle.

To begin by referring to FIGS. 1 and 2, the reference numeral 1 indicates a bottom box body which is integrally molded of plastics. This bottom box body 1, which is vertically open, is surrounded by four rectangular wall plates in the form of an oblong or rectangle. Out of these four rectangular wall plates, numerals 2,2' indicate two side plates, numeral 3 indicates a front plate and numeral 4 a rear plate. Both of these side plates 2,2' are broader in their up-to-down width than the front plate 3 and the rear plate 4. The lower parts of these side plates 2,2' are each elongated at both sides into leg parts 5,6,7,8, while the rear plate 4 is stretched out likewise at the lower ends of both sides to conjunctly form leg parts 6',8', which serve also as backplates for preventing a garbage receptacle, described after, from sliding off rearwards. On the inner wall faces 10 of the four wall plates of the bottom box body 1, the respective shelves 9 for mounting a sheet of wire net 20 are provided consecutively while projecting inwardly. The wire net is shown raised from its normal resting position on the shelves 9 to avoid obscuring underlying parts. In this case, since both side plates 2,2' and the front and rear plates 3,4 are different in vertical height, the above-mentioned mounting shelves on the front and rear plates 3,4 come to be provided at lowest edges jointly. The mounting shelf 9 of the front plate 3 is not always required, as mentioned below. Accordingly, when the mounting shelf a is not formed on the front plate 3, it will do if the sheet of wire net is made to shift so as to be able to be inserted from the front opening 14 into the bottom box and to be removed vice versa. Apart from this, protruding pieces 12 to slidably mount the garbage receptacle 11, described after, are provided on the inner wall faces 10 of both side plates 2,2' situated lower than the mounting shelf 9. These protruding pieces 12 are separated into two parts: a front protruding piece 12a and a rear protruding piece 12b. The front protruding piece 12a is provided slantwise only at its front half part 15 down-to-up turned, viewed from the front plate 3 side. Its rear half part 16 is jointly formed in parallel with the above mounting shelf 9. On the other hand, the rear protruding piece 12b in the example was formed slantwise down-to-up turned similarly to the front half part 15 of the front protruding piece 12a. It does not matter whether it would be formed in the same flat-shape as the above rear half part 16, nor does it matter about the number of such moldings. As for the form of the above protruding pieces 12, it will do as well with a flat-shape as shown in FIG. 1 of the drawings as with an oval one. It makes no difference whatever form it may take. Further, it is good that the inward projecting breadth of the protruding pieces 12 are either smaller than or equal to the breadth of the mounting shelf 9 lying in the upside.

The reference numeral 11 indicates the garbage receptacle of the bottom box body 1. A flange 13 is provided jointly on the top edge of the circumferential wall of this garbage receptacle 11. In order to insert the garbage receptacle 11 into the bottom box body 1 to load it herein, it is first inserted from the front opening 14 into the bottom box body 1 in the direction of the arrow B, then the flange 13 of the garbage receptacle 11 is put on the front half part 15 of the protruding pieces 12 of the bottom box body 1, and is made to slide along the slant face of the front half part 15, whereby the garbage receptacle 11 moves up to the rear plate to be able to be loaded within the bottom box body 1. In this case, both the rear half part 16 of the front protruding piece 12a and the top end of the rear protruding piece 12b are designed to be equal in height. The flange 13 of the garbage receptacle 11 comes to be horizontally supported by the protruding pieces 12 designed as above, mounting the garbage receptacle 11.

Inasmuch as this invention has been so constructed as mentioned above, there is no necessity for providing a bottom plate in the bottom box as before, because, in spite of not providing the bottom plate, the garbage receptacle 11 is able to wholly receive water-drops or minute garbage splashed in the bathing time of the small animal or the little bird, and consequently there is no possibility of waterdrops and others coming down under the bottom box and soiling the surroundings.

To be more precise, in the present invention, the mounting shelf 9 for the sheet of wire net is formed consecutively along the inner circumferential faces of both side plates 2,2' and the rear plate 4 of the bottom box body 1, so that the gap remained unremovably between both plates 2,2' together with the rear plate 4 and the circumferential wall of the garbage receptacle 11 in the conventional bottom box 1, which gap is now covered by the mounting shelf 9 since the garbage receptacle 11 can be inserted to be mounted on the protruding pieces 12 formed directly under the mounting shelf 9 because this mounting shelf 9 comes to lie just over the above gap.

In such an arrangement, waterdrops or feed residua, which have been liable to intrude into the above-mentioned gap so far, come to fall along the upper surface of the mounting shelf 9 into the bottom of the garbage receptacle 11 laid underneath, thus the garbage receptacle 11 being able to receive without fail the waterdrops and minute rubbish. In this connection, such a mounting shelf 9 as described above is not always required to be provided on the front plate 3 because there is no possibility of the referred-to gap being created between the front plate 3 and the garbage receptacle 11.

Further, the bottom box according to the invention has the ability to be used for a large-sized pet cage keeping a mynah bird and such like because this bottom box is constructed of four side walls 2,2',3,4, and consequently it is held resistant to twist and strain and is capable of standing under a great weight.

What is more, since this invention is only so contrived as to provide some means for slidably mounting the garbage receptacle 11 in the form of a plurality of protruding pieces 12,12' . . . directly under the mounting shelf 9 for the sheet of wire net, the bottom box according to the invention can be integrally made without being in need of employing some complicated and expensive mold such as a split pattern and the like, and only with help of an injection mold such as a slide core, a finger pin and others as are well-known in one of the methods of plastic molding. There might be hitherto some difficulty to this case such that the garbage receptacle 11 can be hardly inserted through the front opening 14 into the interior of the bottom box. However, this invention is so devised as to be able to carry out its own function even without the provision of some kind of sliding shelves or rails, because the garbage receptacle 11 can be slidably inserted along the slant face on the front half part 15 of the front protruding piece 12a of the above-described protruding pieces 12,12', which slant face is formed down-to-up turned, viewed from the front plate side.

All things considered, the bottom box according to our present invention may be said to be such a one that makes an epoch in the making of the bottom box for pet cages, on the grounds of getting rid of the harmful influence resulting from the removal of the bottom plate from conventional bottom boxes and further of satisfactorily meeting the existing economic situation of the world by having reduced so much the amount of molding material consumed by the portion of the removed bottom plate, thereby enabling to supply the market with the production of plastics in low prices and in large quantities.

What is claimed is:

1. A bottom structure for underlying a pet cage comprising an integral plastic molding including a rectangular body having side walls, a front wall, and a back wall and being vertically open, a shelf on said side walls and at least said back wall and spaced down from the top of said walls, said shelf being perpendicular to the respective walls and leaving an open center section, said shelf being adapted to support a sheet of wire or the like, said walls being of limited vertical extent, leg means adjacent the intersections of said walls for supporting said walls above a supporting surface, said side walls depending below both said front and rear walls, each of said side walls having a plurality of inward protuberances thereon spaced below said shelf, and a rectangular refuse receptacle open only at its top, said refuse receptacle having lateral flange means at its upper extremity received on said protuberances and below said shelf and a sheet of wire net or the like supported on said shelf, one protuberance on each side wall being relatively adjacent the front wall and having a ramp portion running up from relatively towardly the front wall to relatively towards the rear wall and joining a further portion substantially parallel to said shelf, and a second protuberance on each sidewall farther from the front wall than said one protuberance having only a ramp portion, the upper extremities of both of said protuberances being spaced from said shelf substantially the thickness of said flange means to support said flange means substantially against said shelf.

2. A bottom structure as set forth in claim 1 wherein the leg means at the front comprise downward extensions of the side walls and the leg means at the back comprise downward extensions both of the side walls and the back wall and limit insertion of said receptacle from the front to back of said body.

* * * * *